US011220363B2

(12) United States Patent
Konig et al.

(10) Patent No.: US 11,220,363 B2
(45) Date of Patent: Jan. 11, 2022

(54) PACKAGING METHOD AND TRANSPORT PACKAGING AS WELL AS A DRONE FOR RECEIVING THE PACKAGES

(71) Applicant: Armin Konig, Oberthal (DE)

(72) Inventors: Armin Konig, Oberthal (DE); Jörg Wagner, Konz (DE)

(73) Assignee: ARMIN KONIG, Oberthal (DE)

( * ) Notice: Subject to any disclaimer, the term of this patent is extended or adjusted under 35 U.S.C. 154(b) by 268 days.

(21) Appl. No.: 16/346,371

(22) PCT Filed: Nov. 1, 2017

(86) PCT No.: PCT/DE2017/000361
§ 371 (c)(1),
(2) Date: Apr. 30, 2019

(87) PCT Pub. No.: WO2018/082725
PCT Pub. Date: May 11, 2018

(65) Prior Publication Data
US 2020/0071010 A1    Mar. 5, 2020

(30) Foreign Application Priority Data

Nov. 1, 2016   (DE) .................... 10 2016 012 963.8

(51) Int. Cl.
*B64C 39/02* (2006.01)
*B64D 1/08* (2006.01)
(Continued)

(52) U.S. Cl.
CPC ............ *B65B 31/04* (2013.01); *B64C 39/024* (2013.01); *B64D 1/08* (2013.01); *B64D 1/22* (2013.01);
(Continued)

(58) Field of Classification Search
CPC ............................. B65D 81/07; B65D 81/075; B64C 2201/128; B64C 2201/027;
(Continued)

(56) References Cited

U.S. PATENT DOCUMENTS 2,615,707 A * 10/1952 Rowe .................... F16F 15/067
267/72
2,696,322 A * 12/1954 Densen .................. B65D 81/07
217/52
(Continued)

FOREIGN PATENT DOCUMENTS

EP     2504241 A1    10/2012
GB     1001757 A      8/1965

OTHER PUBLICATIONS

Electronic Vacuum Pump S2—video presentation, published on Apr. 28, 2017, retrieved from URL https://www.youtube.com/watch?v=GRxzlacYUC0 on Apr. 21, 2021 (Year: 2017).*
(Continued)

*Primary Examiner* — Valentin Neacsu
(74) *Attorney, Agent, or Firm* — Tarolli, Sundheim, Covell & Tummino LLP

(57) ABSTRACT

The invention relates to a packaging method, a transport package, and use of the packaging method for transporting products by means of a drone. According to the invention, a product to be packaged is placed in an open inner wrapping that is pretensioned on elastic traction cables in order to hold the product approximately centrally in an outer package. After insertion, the wrapping is closed and evacuated until it lies tightly against the product, and the traction cables are thereby further tensioned.

9 Claims, 4 Drawing Sheets

(51) Int. Cl.
  B64D 1/22    (2006.01)
  B64F 1/32    (2006.01)
  B65B 31/04   (2006.01)
  B65D 81/02   (2006.01)
  B65D 81/38   (2006.01)
  B66D 1/60    (2006.01)
  G06Q 10/08   (2012.01)
  G06Q 50/28   (2012.01)
  B65D 81/07   (2006.01)

(52) U.S. Cl.
  CPC .............. *B64F 1/32* (2013.01); *B65D 81/022* (2013.01); *B65D 81/07* (2013.01); *B65D 81/3825* (2013.01); *B66D 1/60* (2013.01); *G06Q 10/0832* (2013.01); *G06Q 50/28* (2013.01); *B64C 2201/128* (2013.01); *B65B 2220/18* (2013.01); *G05D 2201/0216* (2013.01)

(58) Field of Classification Search
  CPC .......... B64C 2201/108; B65B 2220/16; B65B 2220/18; B64D 1/08; B64D 1/22
  USPC ................. 53/432; 206/583, 521, 591, 806; 248/604
  See application file for complete search history.

(56) References Cited

U.S. PATENT DOCUMENTS

| | | | | | |
|---|---|---|---|---|---|
| 2,932,546 | A * | 4/1960 | Marggraf | ............... | B65D 81/07 312/352 |
| 3,429,095 | A * | 2/1969 | Gale | ..................... | B65B 63/028 53/399 |
| 3,754,803 | A * | 8/1973 | Underwood | ........... | B65D 81/07 312/31 |
| 4,013,170 | A * | 3/1977 | Hutterer | ................. | B65D 81/07 206/521 |
| 4,606,460 | A * | 8/1986 | Luray | .................... | B65D 81/07 206/583 |
| 5,655,662 | A * | 8/1997 | Garcia | .................. | B65D 81/07 206/583 |
| 7,516,597 | B1 * | 4/2009 | Roose | .................... | B65B 55/20 53/139.5 |
| 8,037,662 | B1 * | 10/2011 | Roose | .................... | B65B 55/20 53/449 |
| 8,707,660 | B2 * | 4/2014 | Howes | ...................... | B65B 9/20 53/450 |
| 9,387,928 | B1 | 7/2016 | Gentry et al. | | |
| 9,536,216 | B1 * | 1/2017 | Lisso | ...................... | G01S 19/13 |
| 9,650,136 | B1 * | 5/2017 | Haskin | .................. | B64C 39/024 |
| 9,939,041 | B2 * | 4/2018 | Kronkright | ........... | F16F 15/022 |
| 10,252,833 | B2 * | 4/2019 | Hao | ...................... | B65D 81/127 |
| 10,457,421 | B2 * | 10/2019 | O'Toole | .................. | B64D 1/12 |
| 2004/0140243 | A1 * | 7/2004 | Roesel | ................... | B65D 81/07 206/583 |
| 2005/0121354 | A1 * | 6/2005 | Gillis | ..................... | B65D 81/07 206/583 |
| 2006/0108256 | A1 | 5/2006 | Bussey, III et al. | | |
| 2012/0269459 | A1 * | 10/2012 | Howes | ................... | B65D 81/07 383/37 |
| 2016/0159496 | A1 * | 6/2016 | O'Toole | ................ | B64C 39/024 244/110 E |
| 2016/0185466 | A1 * | 6/2016 | Dreano, Jr. | ........ | G06Q 30/0635 705/26.81 |
| 2016/0297596 | A1 * | 10/2016 | Yamashita | ........... | B65D 5/5028 |
| 2017/0036851 | A1 * | 2/2017 | Kronkright | ............. | F16F 15/06 |
| 2017/0147975 | A1 * | 5/2017 | Natarajan | ............ | G05D 1/0676 |
| 2017/0203857 | A1 * | 7/2017 | O'Toole | ................ | A47G 29/141 |
| 2017/0316701 | A1 * | 11/2017 | Gil | ........................ | G08G 5/0069 |
| 2019/0263521 | A1 * | 8/2019 | O'Brien | .................. | B64D 9/00 |
| 2019/0352007 | A1 * | 11/2019 | Takemoto | ............ | B65D 81/022 |

OTHER PUBLICATIONS

Predominantly—dictionary entry retrieved from URL https://www.merriam-webster.com/dictionary/predominantly on Apr. 21, 2021 (Year: 2021).*

Wrapping—dictionary entry retrieved from URL https://www.merriam-webster.com/dictionary/wrapping on Apr. 21, 2021 (Year: 2021).*

International Search Report for PCT/DE2017/000361 dated Apr. 4, 2018.

* cited by examiner

PACKAGING METHOD AND TRANSPORT PACKAGING AS WELL AS A DRONE FOR RECEIVING THE PACKAGES

RELATED APPLICATIONS

The present invention is a U.S. National Stage under 35 USC 371 patent application, claiming priority to Serial No. PCT/DE2017/000361, filed on 1 Nov. 2017; which claims priority of DE 10 2016 012 963.8, filed on 1 Nov. 2016, the entirety of both of which are incorporated herein by reference.

The invention relates to a packaging method and a transport package as known from EP 2 504 241 B1, for example, and a drone for appropriately accommodating packages.

Known transport packages are made of plastic or corrugated cardboard, for example. To protect a product to be transported therein from impacts or moisture, padding materials or hygroscopic packets are also included and shipped with the package. These protective materials are disposed of after shipment, and are seldom reused. Despite such padding, the packaging is not always completely effective. Often, sufficient padding is not always provided on all sides of the product, or not enough padding remains on all sides of the product due to vibrations during transport. The hygroscopic material has only a certain capacity, and this capacity is sometimes exhausted during transport by sea, for example. The product, despite being packaged with toxic materials, may thus become wet, and upon arrival the product, which is now defective, may be considered to be unsafe.

Known drones have at least one base body, one rotor, and optional support legs.

The object of the invention is to improve the packaging, optionally with provision of a new package, in particular also by transport by means of drones.

This object is achieved by a packaging method and a transport package according to the independent main claims. In addition, a drone that utilizes the package principle according to the teaching of the invention achieves the object of accommodating packages in drones.

Advantageous embodiments are disclosed in the subclaims, the description, and/or the figures.

In a packaging method according to the invention, initially a product to be packaged is placed in an open inner wrapping of a package, during or after which the inner wrapping is pretensioned on elastic traction cables by pulling from the outside, or is suspendable on the outside on outer tensioning points using elastic traction cables, for example. The product is thus held approximately centrally in an outer package or in an outer frame. After the product is inserted, the inner wrapping is closed and predominantly evacuated until the inner wrapping lies tightly against the product. The evacuation results in additional stretching of the traction cables. The at least predominant evacuation thus further stretches the traction cables, and positions the product even more securely, approximately in the center of the package.

No cushioning material is necessary for this purpose. In addition, no hygroscopic material, which is toxic and would have to be included with the product, is necessary to keep the product dry. In order to guarantee continuous sealed transport of the product, a negative pressure must still be present upon arrival, which is the purpose of the predominant evacuation.

In one advantageous embodiment of the packaging method, the traction cables are not suspended in the manner of a folding box made of plastic or a corrugated cardboard package, such as in a conventional package, but instead are suspended in support legs of a drone. This type of drone packaging does not have outer walls, but may possibly have a stretched fabric between the support legs. The support legs of the drone are thus the exterior of the package. It is particularly preferred that after the evacuation, the support legs may be spread out further in order to optimize the centering in a protected area, in particular depending on the size and shape of the product, or also to possibly improve the aerodynamics of the drone only during flight.

Another advantageous transport package, having an outer container and an evacuable inner wrapping, has tensioned cables between the outer container and the inner wrapping, at least one of the tensioned cables having a reversibly stretchable design.

Another advantageous transport package has a preferably removable vacuum pump that is connected to the inner wrapping. In another advantageous embodiment, a vacuum attachment is connected through the outer container, from the inner wrapping to the outside, and is closable from the outside.

For product transport, a drone according to the invention having at least one base body, at least one rotor, and at least two support legs has a wrapping below the base body that is closable in a watertight and gastight manner, and in particular is tensioned between the at least two support legs, but preferably tensioned between the base body and four support legs. A product to be transported is placeable in this wrapping, which lies tightly against the product after an evacuation operation. During evacuation, the dimensions of the wrapping shrink from the relaxed state to a smaller size due to the suction, so that the suspensions stretch and the product is thus securely held beneath the drone by tensioning. Even in the event of a fall, the product can be well protected in this way when, according to one particularly preferred embodiment, a stretched fabric is tensioned at the bottom between the support feet.

Accordingly, the invention achieves numerous advantages by use of the packaging method according to the invention, or a transport package according to the invention, for transporting a product by means of a drone.

The invention is described below based on exemplary embodiments, with reference to the figures, which show the following:

FIG. 1 shows a transport package according to the invention that is foldable, according to a first exemplary embodiment, FIG. 2 shows a transport package according to the invention having a rigid base body, according to a second exemplary embodiment, FIG. 3 shows a transport package according to the invention according to a third exemplary embodiment, after filling an inner shell with a product, FIG. 4 shows the transport package from FIG. 3 with the inner shell evacuated around the product, and FIG. 5 shows a drone with an integrated package according to the invention.

Figure 1:
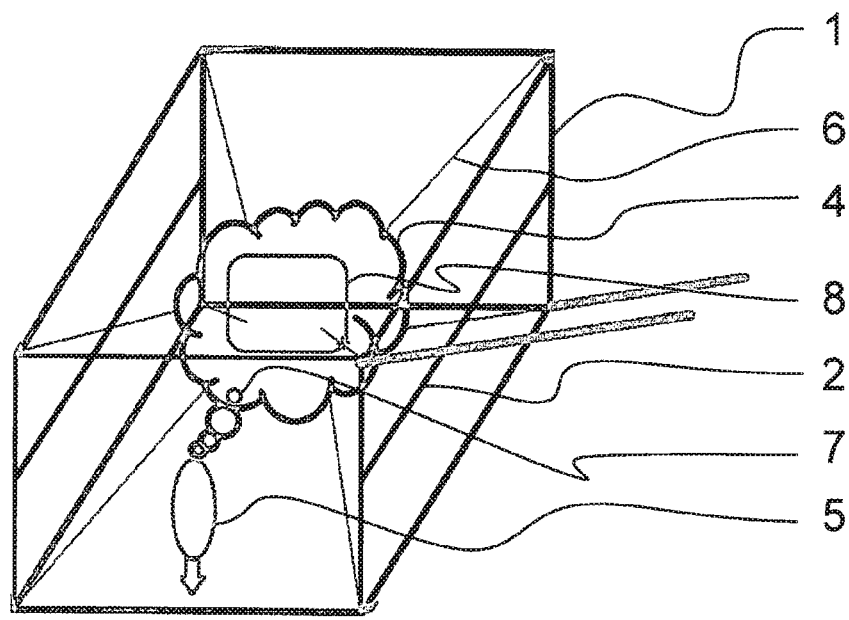
FIGS. 1 through 4 show three exemplary embodiments of transport packages according to the invention.
Figure 2:
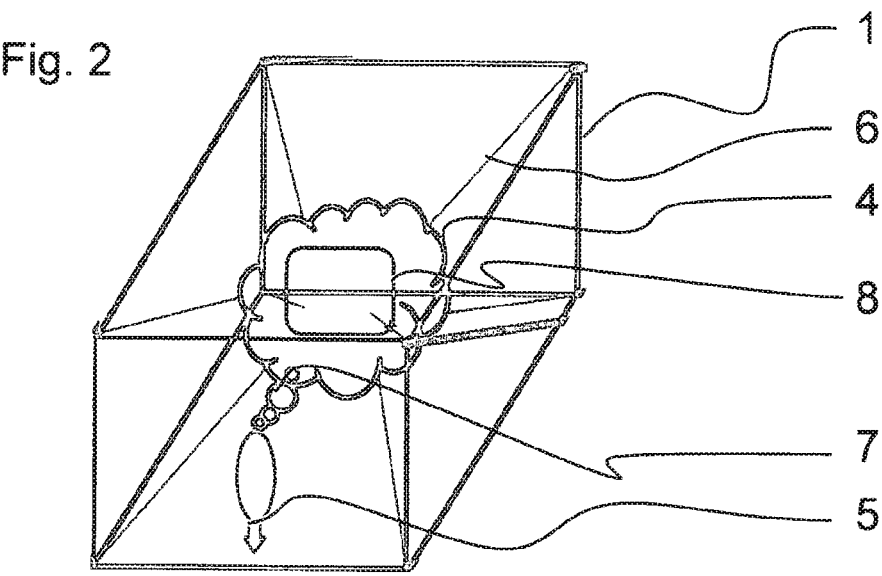
Figure 3:
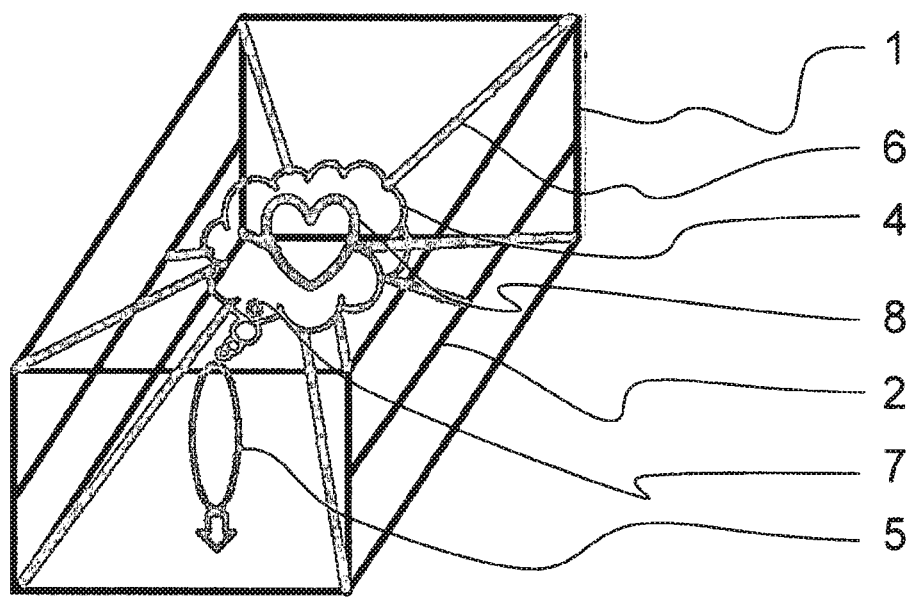
Figure 4:
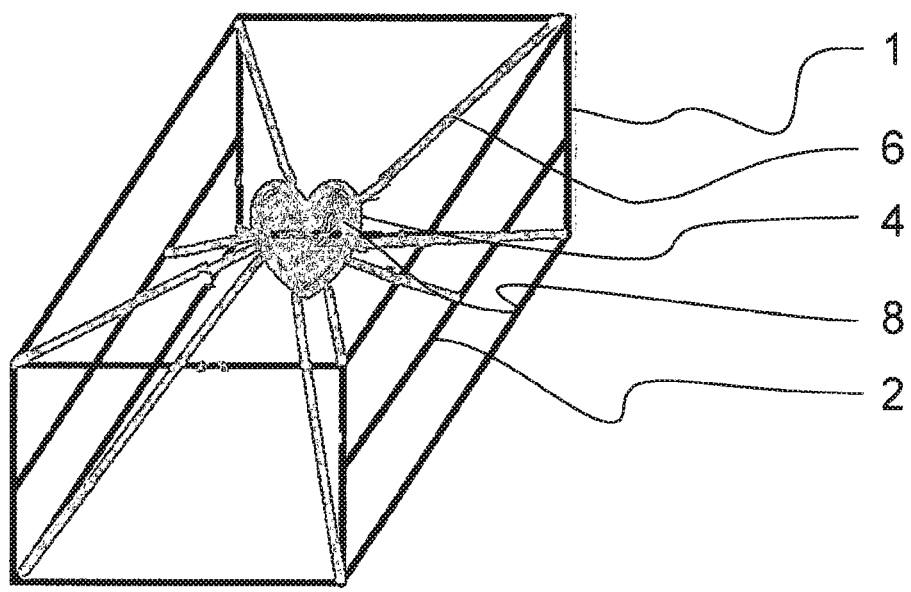

FIG. 1 shows the outside of a folding carton as an outer package or outer container 1, with a horizontal articulated joint in at least two side walls, in each case as a hinge 2 between two side wall halves, to allow the folding carton to be folded or set up in the manner of an accordion. FIG. 1 shows the set-up folding carton with multiple traction cables 6 going from the corners and some side walls toward the center. In the center, an inner wrapping 4 is held against the traction cables 6, and the traction cables 6 pull the wrapping 4 apart. The wrapping is thus held for use of a product, the product 8 to be transported, which in FIGS. 3 and 4 is illustrated as a heart.

In a further method step, the tensioned inner wrapping 4 is closed and evacuated. In the process, the wrapping 4 due to its shrinkage increasingly draws up against the traction cables 6. The traction cables 6 are thus further tensioned beyond a base tension. The product, which is tight in the wrapping 4 due to the evacuation, is protected from moisture and is held approximately centrally in the folding carton by means of the traction cables 6, so that impacts against the outer walls of the folding carton should not affect the product. However, if the impacts were so severe that the product was damaged, the damage to the folding carton would be clearly visible.

A vacuum bag having a quick-pull closure is particularly preferably mounted on rubber cables as traction cables 6. The product 8 to be shipped is subsequently introduced. A vacuum is applied with a hand pump 5, which may remain in the carton during transport. The traction cables 6 are increasingly tensioned until the product 8 is centered in a reusable transport package (FIG. 4). To prevent insufficient evacuation, according to one preferred embodiment a spacer, preferably a screen 7 that prevents closure of the suction valve on the inside, for example by overlapping of the wrapping 4 or by contact with the product 8, is situated on an inner side of a suction valve.

The packaging of a product 8 to be protected is thus carried out more quickly. The overall transport package may be stored in a space-saving manner. Bulky or toxic protective material such as silica gel is not necessary. The product is reliably protected from moisture in the vacuum bag, the inner wrapping 4. Upon unpacking, it is apparent from the package if the vacuum, intended for sufficient negative pressure, has not been maintained. Individual accommodation of various types of products is achieved without having to use costly molded packaging.

In one preferred embodiment of a transport package according to the invention, the vacuum prevailing in the inner wrapping 4 is monitored by means of a pressure sensor, not illustrated in greater detail, similarly as for known vehicle tire pressure monitoring systems. In this way the vacuum, and thus the integrity, is independently monitorable across a transport chain having multiple service providers.

Figure 5:
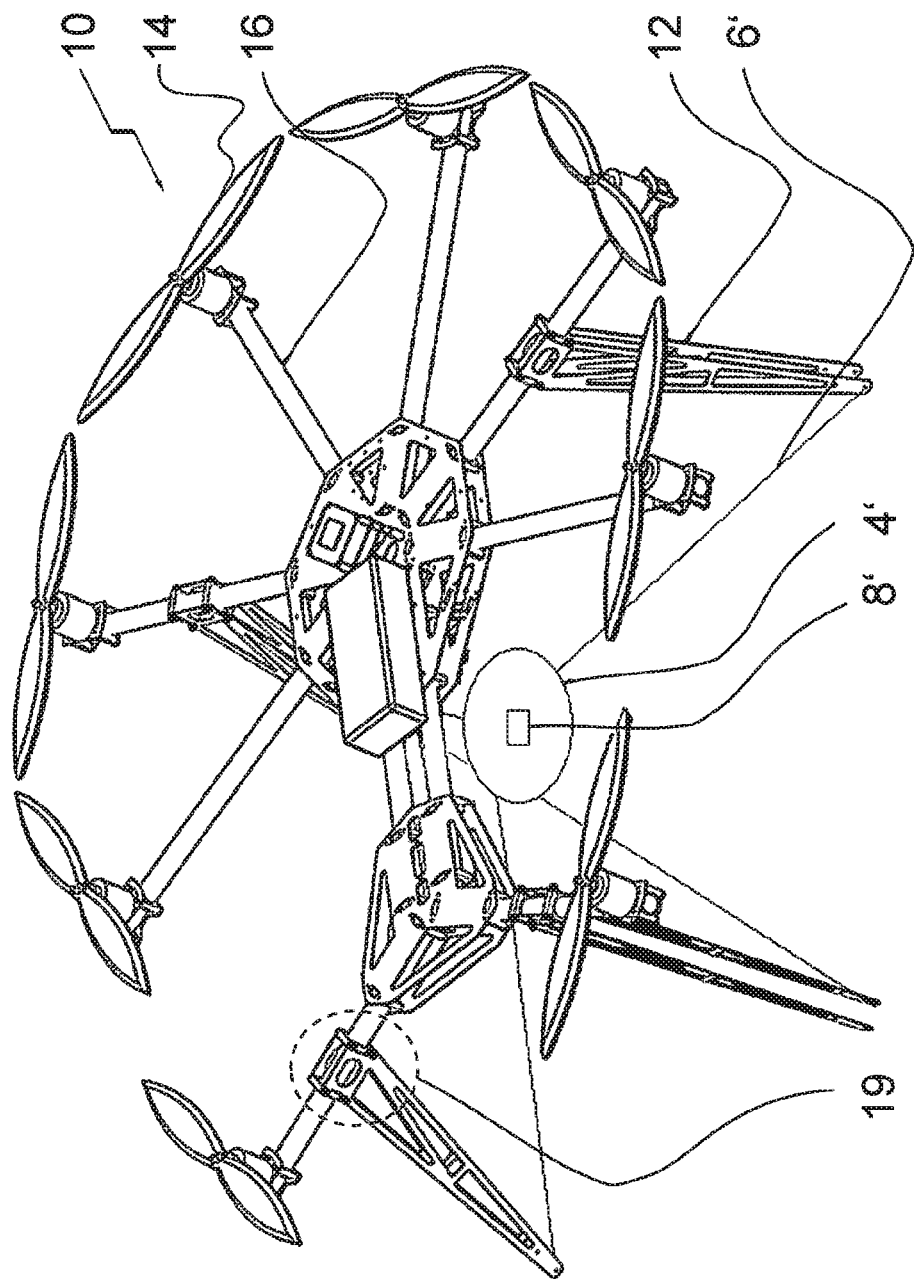
FIG. 5 shows a drone according to the invention according to one advantageous exemplary embodiment.

FIG. 5 shows a drone 10 having a divided base body 18, multiple rotors 14, and at least four support legs 12. According to the invention, in this exemplary embodiment, using the same reference numerals but with provision of an apostrophe, a wrapping 4' that is closable in a watertight and gastight manner is accommodated under tension beneath the base body 18, tensioned with traction cables 6' toward the support legs 12 and the base body 18. A product 8' is placed in the wrapping 4', which is shrunk around the product, thus further tensioning the traction cables 6'. The illustrated exemplary embodiment also shows that the drone 10 has articulated joints 19, for example between the support legs 12 and the rotor arms 16, to be able to further spread the support legs 12 so that the overall drone structure may preferably flatten out during flight.

LIST OF REFERENCE NUMERALS

1 outer container, in particular a folding carton
2 hinge
4, 4' inner wrapping, in particular a vacuum bag
5 hand pump
6, 6' traction cable, in particular made of rubber
7 screen
8, 8' product
10 drone
12 support leg
14 rotor
16 rotor arm
18 base body
19 articulated joint

The invention claimed is:

1. A packaging method, characterized in that a product to be packaged is placed in an open inner wrapping of a package, the open inner wrapping being pretensioned on elastic traction cables or suspended using elastic traction cables in order to hold the product approximately centrally in an outer package or in an outer frame, and after the product is inserted into the open inner wrapping, the open inner wrapping is closed and predominantly evacuated until the open inner wrapping lies tightly against the product, the evacuation resulting in additional stretching of the elastic traction cables, and thus further tensioning of the traction cables.

2. The packaging method according to claim 1, characterized in that the elastic traction cables are externally suspended in support legs of a drone, the support legs being an exterior of the package.

3. The packaging method according to claim 2, characterized in that after the evacuation, the support legs are further spreadable in order to improve an aerodynamics of the drone during flight, depending on a size and a shape of the product.

4. The packaging method according to claim 1, further comprising transporting the product by means of a drone.

5. A transport package for a product having an outer container and an evacuable inner wrapping, wherein at least two elastic traction cables tension an inner wrapping approximately centrally inside the outer container, wherein each of the at least two elastic traction cables has a first end attached to the inner wrapping, and a second end attached to the outer container, and wherein the at least two elastic traction cables are in a first state of tensioning before the product is received into the inner wrapping, and in a second state of tensioning after the product is received into the inner wrapping and the inner wrapping is sealed and vacuumized.

6. The transport package according to claim 5, characterized in that a vacuum pump is attached to the inner wrapping, or a vacuum attachment is led through the outer container from the inner wrapping to the outside, and is closable from the outside.

7. The transport package according to claim 5, wherein the product is transported by means of a drone.

8. A drone for transport of a product, having a base body, at least one rotor, and at least two support legs, characterized in that a wrapping that is closable in a watertight and gastight manner is tensibly accommodated below the base body, wherein traction cables support the wrapping below the base body and have two ends, a first end of each traction cable being attached to the wrapping, and a second end of each traction cable being attached to a respective support leg of the at least two support legs, a product being insertable into the wrapping, and the wrapping lying tightly against the product after an evacuation operation wherein the traction cables are in a first state of tensioning before the product is inserted into the wrapping, and in a second state of tensioning after the product is inserted into the wrapping and the evacuation operation.

9. The drone according to claim 8, wherein the at least two support legs of the drone form an outer frame, and the outer frame and the wrapping define a transport package.

\* \* \* \* \*